March 5, 1929.  W. L. DENTON  1,703,993
ELECTRIC COMPRESS HEATER
Filed July 28, 1927
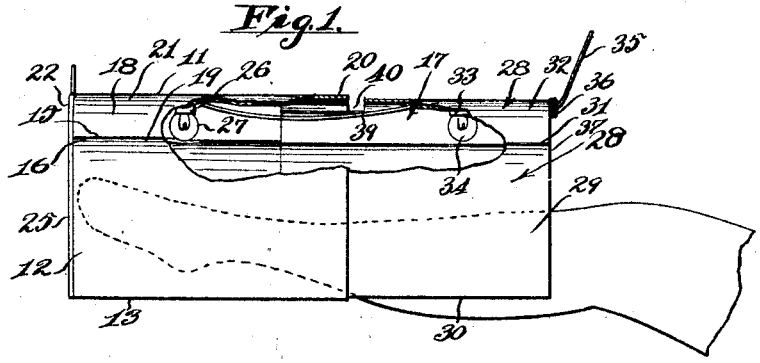
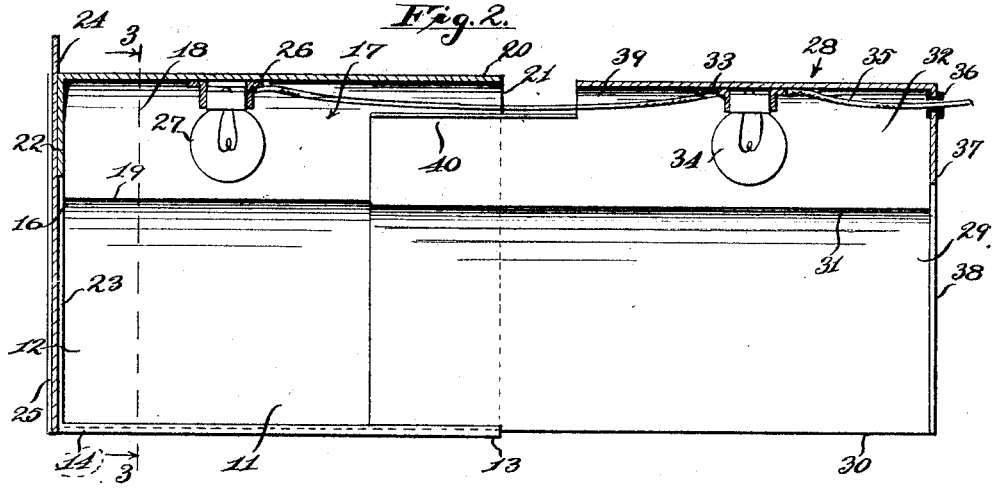
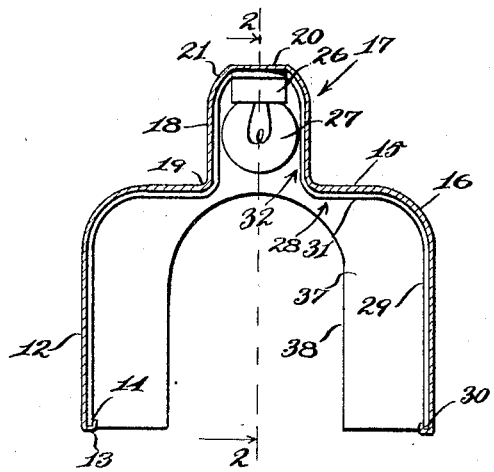
Inventor
W. L. Denton
by Hazard and Miller
Attorneys Patented Mar. 5, 1929.

1,703,993

UNITED STATES PATENT OFFICE.

WILLIAM L. DENTON, OF RANDSBURG, CALIFORNIA.

ELECTRIC COMPRESS HEATER.

Application filed July 28, 1927. Serial No. 208,948.

My invention is an electric compress heater to maintain hot wet compresses for treating different parts of the body at a hot and uniform temperature.

In the treatment of various parts of the body by hot wet compresses, it has been necessary to change the compresses frequently on account of their rapid cooling. This, in some cases, makes it necessary to have the constant attention of a nurse or attendant, as well as being inconvenient for the patient.

An object, therefore, of my invention is a compress heater which will act to maintain wet compresses when placed on the body at the proper hot temperature by preventing their cooling, as well as maintaining the compresses sufficiently moist to be effective in the treatment undertaken.

Another object of my invention is the construction of a compress heater in the form of a casing or housing which may be placed over the body, such as the legs, arms, etc., and having electric lamps or heating elements therein which will maintain compresses hot, and at the same time avoid drying the compresses to a material extent.

Another object of my invention is to form the compress heater so that it may be closed at one end by a sliding gate, or the gate be opened to allow passing of the leg or arm or the trunk of the body through the heater, and in addition, making of the heater telescopic so that it may be compressed into a short length or extended to form a long heater.

In constructing the heater I form a casing or cover which is open on the bottom and has substantially straight sides with a horizontal top with curves merging at the corners. Above the top there is a lamp receptacle forming a channel extending upwardly from the main portion of the top.

The device is preferably made in two lengths, one part having an inwardly turned rim at the bottom edge to engage the lower edge of the other part and therefore allow sliding. The ends of the heater have openings and one of these is closable by a slidable partition or slidable door which raises and lowers.

My invention is illustrated in the accompanying drawings, in which:

Figure 1 is a side elevation partly broken away of my compress heater as applied to a person's leg and foot.

Figure 2 is a longitudinal section taken on the line 2—2 of Fig. 3 in the direction of the arrows, the lamps and their sockets being shown in elevation.

Figure 3 is a vertical cross section on the line 3—3 of Fig. 2 in the direction of the arrows.

In constructing my invention I have an outer section or casing 11 with side walls 12 turned inwardly as indicated at 13, forming longitudinal grooves 14 at opposite sides. The top walls 15 are horizontal and merge into the side walls 12 by curves 16. A longitudinal channel 17 is formed by upper side walls 18 having curved corners 19 merging into the top 15. The channel has an upper wall 20 preferably merging into the walls 18 by a curve 21. Connected to one end of this section 11 is the end wall 22 which has an opening 23 therethrough. This opening is closed by a slidable gate 24 which operates in vertical grooves 25 formed on the opposite side edges of the end 22.

A lamp socket 26 is secured to the upper wall 20 and a lamp 27 or other heating element may be secured therein. An inner telescopic section 28 is of substantially the same shape as the section 11, having side walls 29, the lower edge 30 of which slides in the grooves 14. The top 31 fits underneath the top 15 of the section 11 and the channel 32 is formed of the same shape as the channel 17, and has a lamp socket 33 with a lamp 34 therein. An electric lead wire is connected to the socket 33 and passes through an insulator 36 in the end 37, this end being formed with an opening 38. The electric wire 39 may be connected between the sockets, having these in series, or the wire 39 may be separate, putting both lamps in parallel if desired.

The upper inner corners of the channel 32 of the inner telescopic section has a cut-out part 40 to allow this to pass the socket 26 so that if desired the inner section may be shoved substantially completely in the outer section, or may be pulled out substantially the full length of both of the sections.

The manner of using and functioning of my electric compress heater is substantially as follows:

After a hot wet compress has been placed on the patient's body, as for instance on the leg as shown in Fig. 2, the heater is then placed over the leg, with the opening 38 fitting over the upper part and the gate 24 closed so that the foot will not be exposed.

This is presuming that the compress covers the foot. A packing of cotton or other material may then be placed around the leg at the opening 38, forming a sufficiently tight closure, and the electric lamps switched in the electric circuit. The heat from the lamps is then sufficient to maintain the compresses hot, and without substantially evaporating moisture therefrom, as there is very little opportunity for moisture to escape from the telescopic casing.

For instance, the foot is to be exposed: The gate 22 may be lifted and the foot pass through the opening 23, the gate then being lowered, or the space filled with a packing of cloths, towels, or the like, forming a sufficient closure or packing at both ends of the casing.

It is apparent that by collapsing the structure, the two telescopic sections, one in the other, that electric lamps or heaters may be placed relatively close together and thus give a concentrated heat on a short section and in this regard it is to be understood that heating elements may be substituted for ordinary lamp; or if a light treatment is desired that ultra violet or other forms of treating lamps may be substituted.

It is to be understood that my electric compress heater may be made in various shapes and designs suitable for treating various parts of the body such as the legs, the arms or the trunk, and that for hospital use it will be preferable to have a number of different shapes, rather than rely on one design which may be suitable for all treatments.

One of the features of my invention is that the parts of the body which are under treatment and which may be inflamed are not subjected to the weight of hot water bottles or other heating appliances commonly used to maintain the temperature of hot compresses.

Various changes may be made in the principles of my invention without departing from the spirit thereof, as set forth in the description, drawings and claims.

I claim:

1. In an electric heater, the combination of a casing open at the bottom and having an opening in at least one end, adapted to fit over part of a person's body, a groove like channel extending along the top of the casing, and electric heating elements in said channel.

2. In an electric heater, the combination of a casing open at the bottom and having at least one end with an opening therein of smaller size than the cross section of the casing, adapted to fit over a part of a person's body, a groove like channel along the top of the casing, and electric heating elements in the channel.

3. In an electric heater, the combination of a casing open at the bottom adapted to fit over a part of a person's body, said casing having ends with openings of smaller size than the cross section of the casing, one of said openings being closed by a gate structure, a channel positioned above the casing having electric heating elements therein.

4. In an electric heater, the combination of a sectional casing made in a plurality of parts, one part fitting in the other to allow telescopic movement, the casing being open at the bottom and having ends at least one of which has an opening of smaller size than the cross section of the casing, a channel in the upper part of the sections, and electric heating elements in the channels.

5. In an electric heater, a casing formed of a plurality of sections, each section having side walls, top walls and a channel extending upwardly from the top walls, the sections being interfitting and being telescopic to allow sliding movement, the casing being open at the bottom and having ends, one of which has an opening of smaller size than the cross section of the casing, the other end having a gate forming a closure, and electric heating elements in the channel.

6. In an electric heater, the combination of a casing formed in a plurality of sections, each section having vertical walls, a horizontal top with a channel extending upwardly therefrom, the vertical walls of one of the sections having an inturned lower edge forming a longitudinal groove, the lower edge of the vertical walls of the other section fitting in said groove, the sections telescoping with the vertical walls, the top and channel interfitting, each casing section having an end with an opening and a gate to form a closure for at least one of the openings, and electric heating elements in the channel.

In testimony whereof I have signed my name to this specification.

WILLIAM L. DENTON.